Sept. 3, 1929.   C. R. MOON   1,726,577
FEED AND DISCHARGE MECHANISM FOR PRESSES
Filed April 28, 1928   5 Sheets-Sheet 1
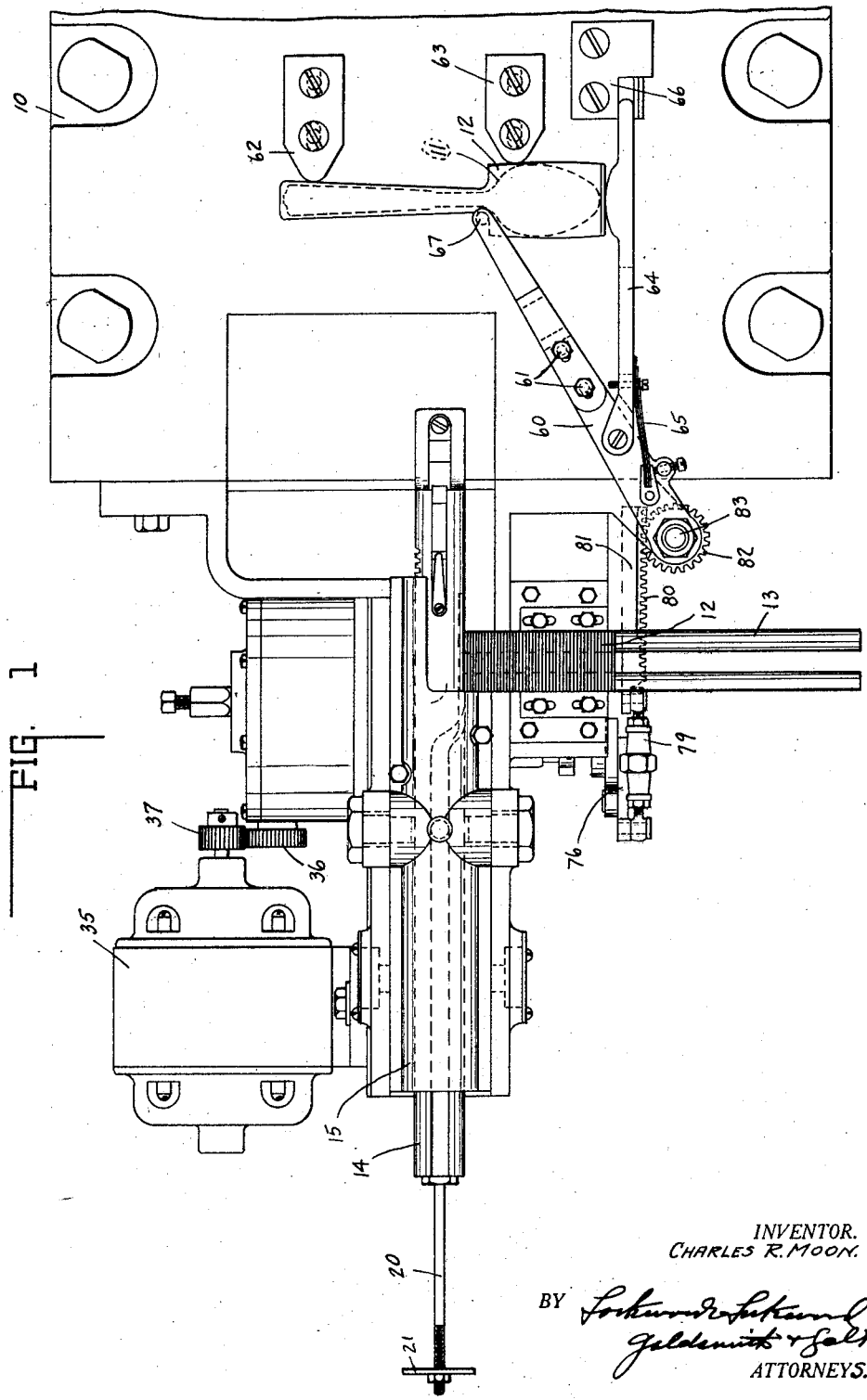
INVENTOR.
CHARLES R. MOON.
BY
ATTORNEYS.

Sept. 3, 1929.   C. R. MOON   1,726,577
FEED AND DISCHARGE MECHANISM FOR PRESSES
Filed April 28, 1928   5 Sheets-Sheet 2
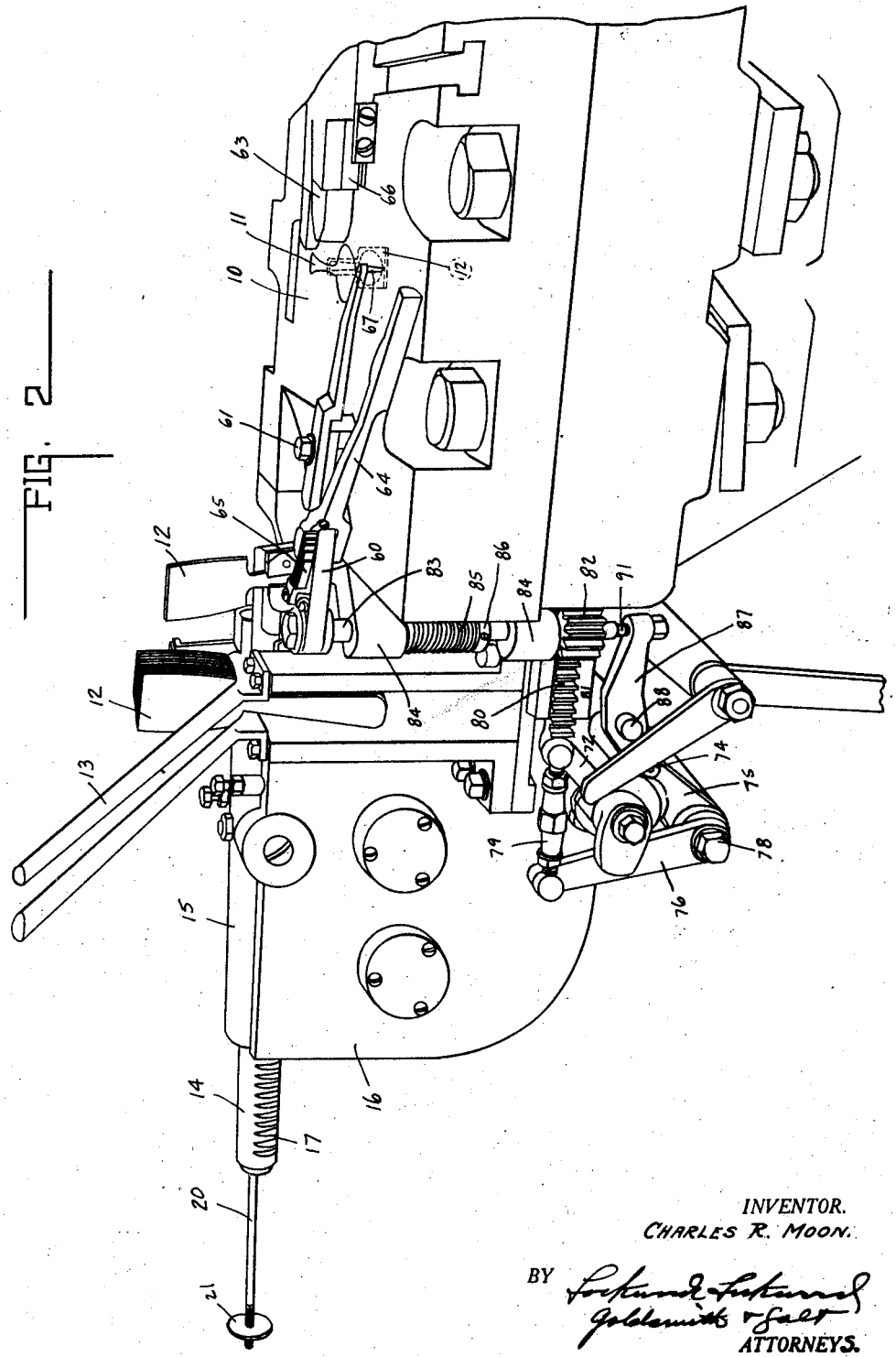
INVENTOR.
CHARLES R. MOON.
BY
ATTORNEYS.

Sept. 3, 1929.　　　　C. R. MOON　　　　1,726,577
FEED AND DISCHARGE MECHANISM FOR PRESSES
Filed April 28, 1928　　5 Sheets-Sheet 3
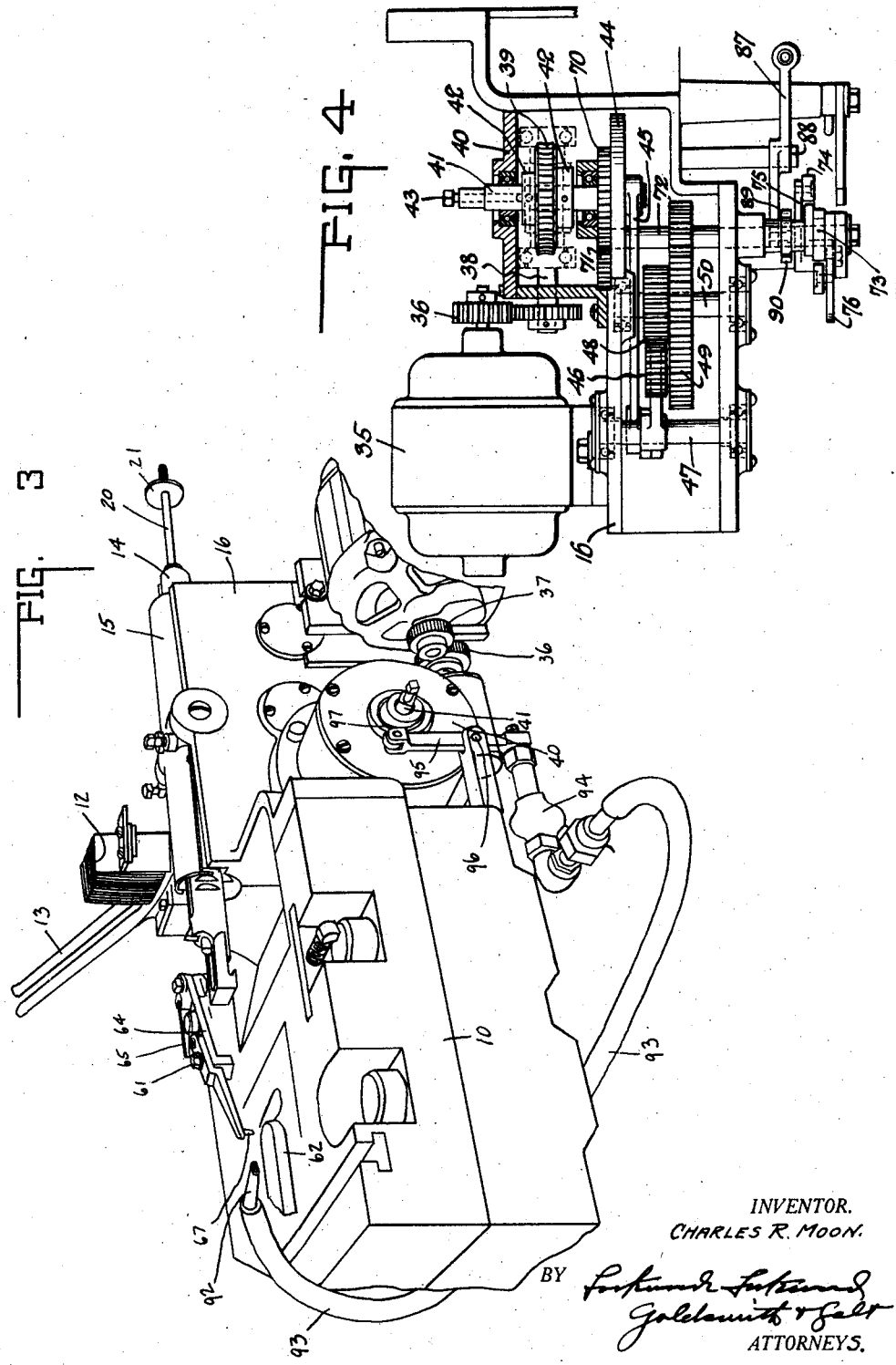
INVENTOR.
CHARLES R. MOON.
BY
ATTORNEYS.

Sept. 3, 1929.  C. R. MOON  1,726,577
FEED AND DISCHARGE MECHANISM FOR PRESSES
Filed April 28, 1928  5 Sheets-Sheet 4
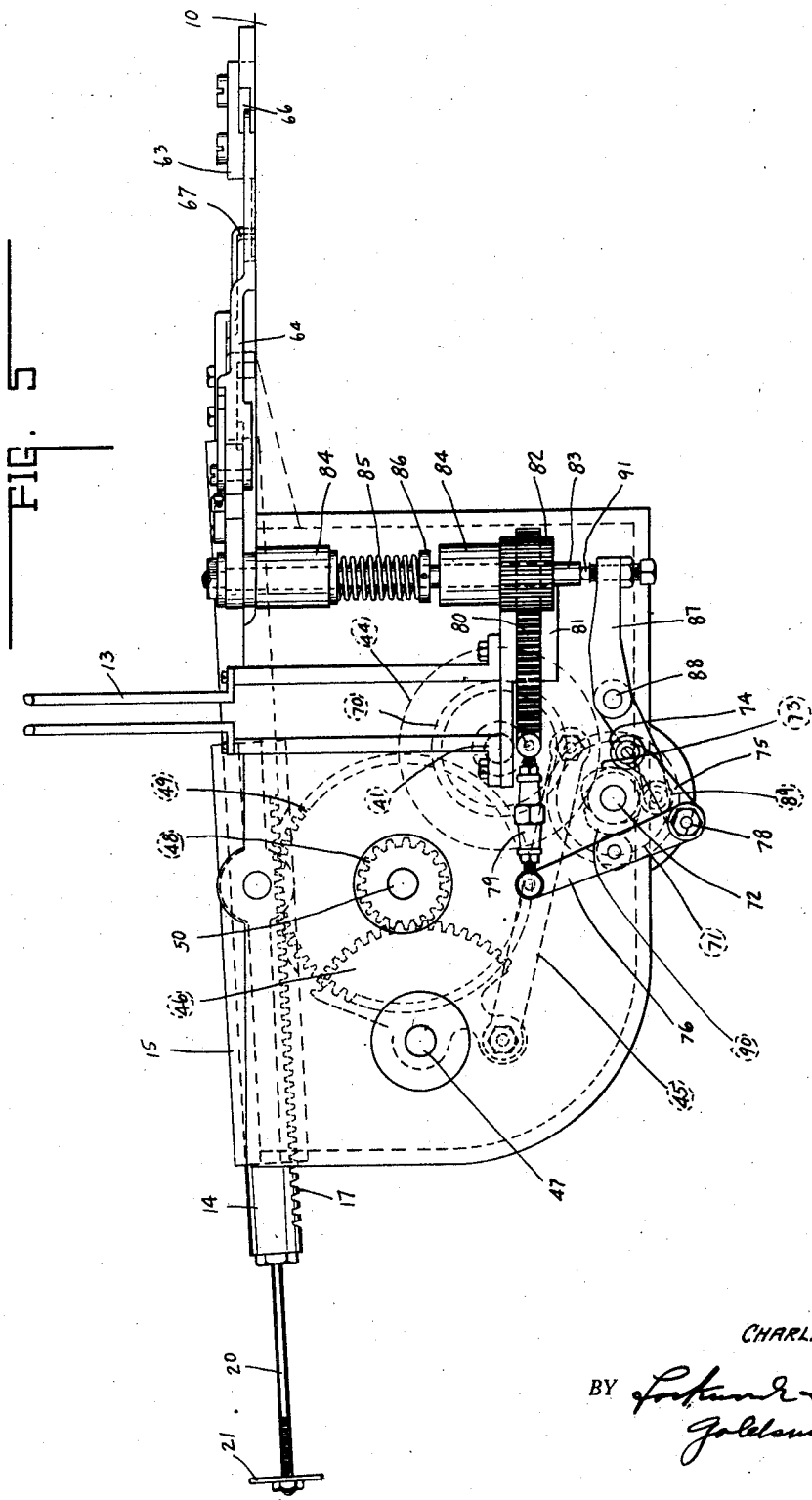
INVENTOR.
CHARLES R. MOON.
BY
ATTORNEYS.

Sept. 3, 1929.　　　　C. R. MOON　　　　1,726,577
FEED AND DISCHARGE MECHANISM FOR PRESSES
Filed April 28, 1928　　　5 Sheets-Sheet 5
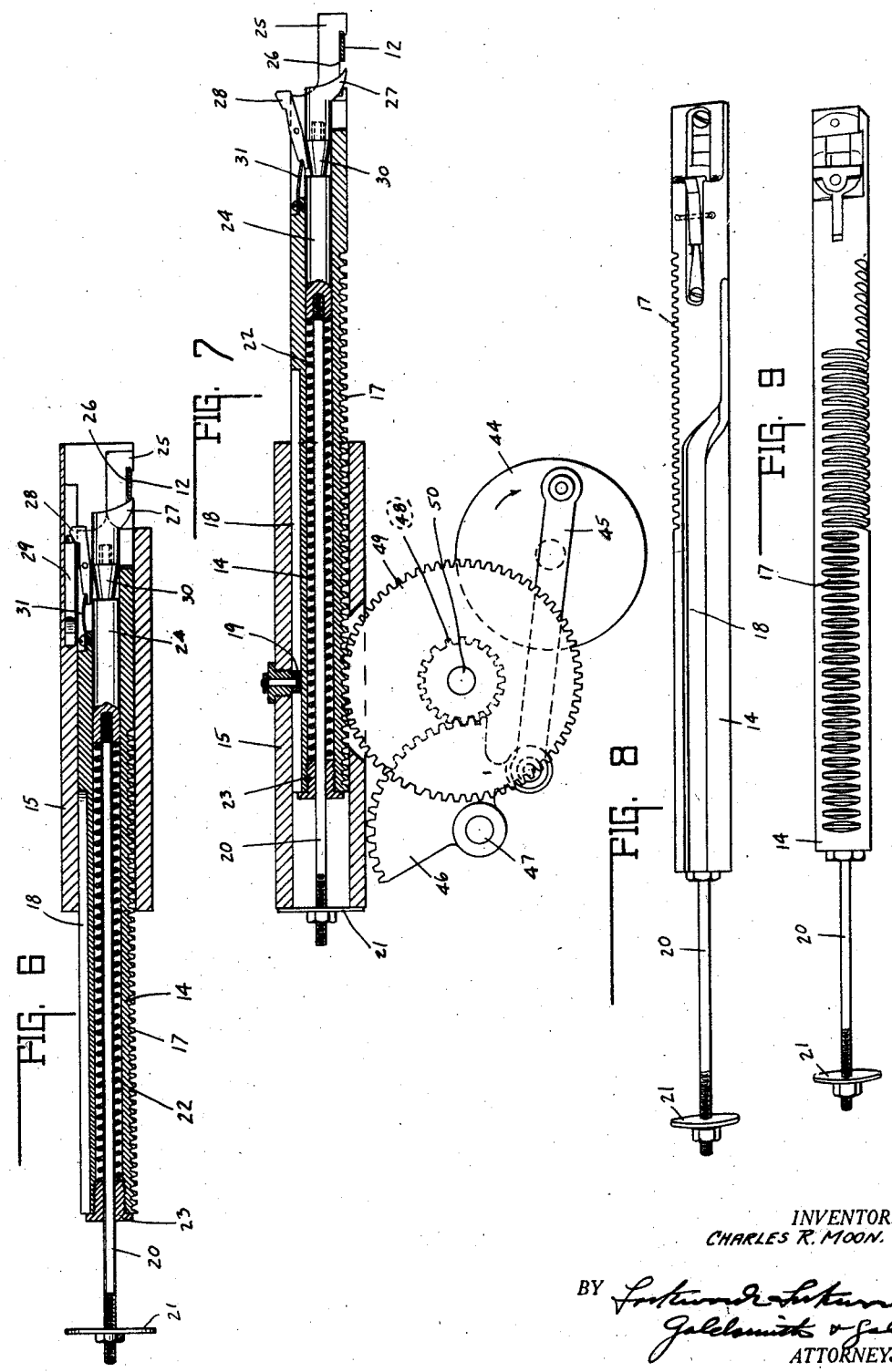
INVENTOR.
CHARLES R. MOON.
BY
ATTORNEYS.

Patented Sept. 3, 1929.

1,726,577

UNITED STATES PATENT OFFICE.

CHARLES R. MOON, OF MUNCIE, INDIANA, ASSIGNOR TO ONTARIO SILVER COMPANY, OF MUNCIE, INDIANA, A CORPORATION.

FEED AND DISCHARGE MECHANISM FOR PRESSES.

Application filed April 28, 1928. Serial No. 273,467.

This invention relates to a feeding and ejecting device for use in connection with stamping machines and particularly that type of machine for stamping cutlery, flatware or other articles from metal blanks.

The object of the invention is to provide a mechanism which is completely automatic in its action, adapted to grasp a metal blank which is supported by a suitable carrier in a vertical position, carry said blank forwardly and lay it down in a horizontal position over the die, thereupon secure it in its horizontal position and hold it while the die head stamps the properly shaped article therefrom, and thereafter eject the remaining scrap of the blank.

One feature of the invention resides in the feeding mechanism for placing the blank in position, and the actuating mechanism therefor.

Another feature of the invention resides in the mechanism for gripping and holding the blank in position to receive the die block and its operating mechanism.

A further feature of the invention resides in the mechanism for causing the remaining scrap to be ejected after the cutting operation.

Still a further feature of the invention resides in the means for removing any broken or mangled particles of metal or scrap from the die blocks in event it is not properly ejected.

The full nature of the invention will be more clearly understood from the accompanying drawings and the following description and claims.

Fig. 1 is a plan view looking down on the mechanism showing the feeding plunger in retracted position and the ejecting mechanism in blank holding position. Fig. 2 is a perspective view of the machine showing the feeding plunger moving a blank forward and the ejector ejecting a scrap blank. Fig. 3 is a perspective view of the machine taken from the opposite side thereof from Fig. 2. Fig. 4 is a plan view of the driving mechanism with parts removed and in cross section. Fig. 5 is a side elevation of the driving mechanism with parts removed. Fig. 6 is a horizontal section through the feeding plunger and barrel showing the blank in grasped position. Fig. 7 is a vertical section taken through the feeding plunger and barrel showing a driving mechanism therefor and the blank being released. Fig. 8 is a perspective view of the feeding plunger showing the clamp actuating trigger and cam slot. Fig. 9 is a perspective view of the feeding plunger showing the rack teeth and clamping members.

In the drawings there is shown a portion of a stamping machine having a die block 10 for blanking out a spoon 11, as indicated, from a blank 12. The die block in the apparatus for operating the same is of the usual character and need not be described herein, it heretofore being customary to feed the blanks in place, hold them and eject them by hand.

The apparatus includes an inclined bifurcated carrier 13 adapted to hold the blanks 12 in upright position so that they will feed into the mechanism by gravity. Extending longitudinally of the mechanism and adjacent the end of the carrier 13 there is a feeding plunger 14 reciprocably mounted in the barrel 15, which is supported on the housing 16. Said plunger is provided with a plurality of teeth 17 extending along the side thereof. That portion of the teeth toward the rear of the plunger are positioned on one side while toward the front of the plunger they are positioned on the under side, and the intermediate portion of the plunger is provided with longer teeth extending from the side around the bottom, as best shown in Fig. 9. Said plunger is also provided with a cam slot 18 in which the roller 19 mounted in the top of the barrel 15 extends. This slot runs longitudinally of the top of the plunger toward the rear thereof and curves downwardly and extends along one side toward the front thereof.

The plunger is hollow and has a rod 20 extending therethrough provided with an adjustable stop disk or head 21 on its end adapted to engage with the rear end of the barrel 15. Said rod is surrounded by the compression spring 22 which abuts at one end against the plug 23 in the rear of the plunger and at its forward end against the gripping head 24 which is secured to the inner end of the rod 20 so as to be slidable within the plunger. The plunger is provided at its forward end with a projection 25 having a recess 26 in which the blank 12 is adapted to engage. Said blank is gripped therein by the projection 27 on the end of the head 24 under the tension of the spring 22. When the plunger is moving to retracted position the blank 12 slides by gravity into the recess 26 and when it is completely retracted, as shown in Fig. 6, the engagement of the trigger 28 by the pin 29 releases the head and the spring 22 acts to force it into blank clamping position. When the plunger moves forwardly in position to release the blank on the die the arresting of the rod 20 by the stop 21 causes the plunger to move forwardly with respect to the arrested head 24 and the trigger 28 to drop down in the recessed portion 30 under the tension of spring 31, while simultaneously withdrawing the projection 27 of the head rearwardly and releasing the blank 12. Thereupon, after the blank has been released and the plunger is returned, it is free to pick up the next succeeding blank and again clamp it when the head of the trigger 28 engages the pin 29.

The driving mechanism for the plunger comprises the motor 35 driving the pinion 36 through the pinion 37. Pinion 37 is keyed to the shaft 38 having a worm thereon adapted to mesh with the worm gear 39 mounted in the gear housing 40. The worm 39 is connected to the shaft 41 through the friction collars 42, one of which is held in frictional engagement by the friction set screw 43. Said shaft has keyed on the other end thereof a crank drive plate or disk 44 having a crank arm 45 pivotally connected therewith and which is connected at its other end with the quadrant gear 46 supported on the shaft 47. Said quadrant gear meshes with the pinion 48 which is connected with the larger gear 49 through the shaft 50. The gear 49 engages and drives the teeth 17 on the plunger 14 regardless of its twisting movement caused by the action of the cam slot 18 as it is driven back and forth by said gear.

From the foregoing it will be noted that the operation of the feeding mechanism is as follows. As the plunger is retracted by the engagement of the gear 49 with the teeth 17 due to the movement of said gear in one direction by the action of the quadrant gear 46, the relatively open recess 26 will be engaged by a blank 12 sliding therein by gravity in a vertical position. As the plunger continues in its rearward movement the trigger 28 releases the gripping head 24 and the spring 22 forces the projection 27 into clamping engagement with the blank so as to hold it secured in vertical position. Thereupon the plunger is moved forwardly by the reverse action of the gear 49 through the quadrant gear 46 until the roller 19 acting in the cam slot 18 causes the plunger to turn a quarter revolution carrying the blank from a vertical to a horizontal position,—that is, lying parallel to the surface of the blanking die or head 10. Continued forward movement of the plunger brings the blank into proper position with respect to the die. Thereupon, the engagement of the stopping member 21 with the rear end of the barrel 15 compresses the spring 22 and releases the blank so that it drops in proper position on the die head. The spring 31 then forces the trigger into the recess 30 for maintaining the projection 27 in open position during the rearward movement of the plunger which is again turned to normal position through a quarter revolution by the cam slot and picks up the next succeeding blank preparatory to having it again gripped by the release of the trigger 28.

The holding mechanism for securing the blank in position while being operated upon in the die press comprises the arm 60 which is adjustable as to length by means of the adjusting nuts 61, which arm acts in conjunction with the adjustably fixed blocks 62 and 63 secured in position on the die head. Pivotally connected with the arm 60 there is a finger 64 which is spring pressed toward the arm 60 by the spring 65. The arm 60 is of such length as to engage a fixed block 66 on the die head. This mechanism also acts as an ejector for the scrap portion of the blank.

In operation, the arm 60 is caused to move in a counter-clockwise direction as the blank is being brought into position by the feeding plunger. It carries therewith the finger 64 until the end of said arm engages the stop 66. The arm 60 continues to move against the tension of the spring 65 until the blank has been dropped into position over the die. At that time, and in timed relation with the action of the plunger said arm is released and a downwardly extending projection 67 on the end thereof engages one side of the blank, as shown in Fig. 1, forcing it against the finger 64 under tension of the spring 65. During this action, and in order that the arm will not interfere with the positioning of the blank by the plunger in its counterclockwise movement, it is elevated above the surface of the die so as to pass over the blank, and then it is lowered in position to engage therewith, as illustrated.

Upon completion of the blanking operation and while the plunger is being retracted to pick up the new blank, the arm 60 is swung in a clockwise direction carrying the scrap blank remaining on the surface of the die head and ejecting it therefrom. After ejecting the blank, it is again elevated and moved in a counter-clockwise direction to engage in a like manner the next succeeding blank placed in position by the feeding plunger.

The driving mechanism for the holding and ejecting arm is driven from the shaft 41 on which is keyed the gear 70 meshing with the gear 71 keyed to the shaft 72. Secured to said shaft 72 there is a cam 73 adapted to engage the roller 74 on the arm 75 which is secured to the lever 76 fulcrumed at 78 and pivoted to the turn-buckle connection 79 which is connected with the rack 80 sliding in the guideway 81 having engagement with the pinion 82. The pinion 82 is of relatively greater width than the rack so that it may slide up and down with the movement of the shaft 83 to which it is secured. Thus, the positioning and ejecting movement of the arm 60 is caused by the action of the rack 80 on the pinion 82 driven by the cam 73.

The shaft 83 is mounted in the bearings 84 between which there is provided a compression spring 85 bearing at one end against a collar 86 secured to the shaft and at the other end against the upper bearing 84.

For elevating the arm so as to permit it to freely pass over the blank when moving in counterclockwise direction, there is provided a lever 87 pivotally supported at 88 and having a roller 89 adapted to be engaged and operated by the cam 90 secured to the shaft 72. At the other end of said lever there is an adjustable engaging screw 91 bearing against the lower end of the shaft 83 so as to periodically raise said shaft against the tension of the spring 85 for elevating the arm 60 as above described, while permitting it to quickly drop not only through the action of gravity but through the downward force exerted thereon by the pressure of spring 85 into position for ejecting the blank.

From the foregoing it will be noted that the mechanism is so timed that while the feeding plunger is placing a blank in position the preceding blank is being ejected by the arm 60, and while the feeding plunger is retracted and picking up a new blank the arm 60 is in position holding the blank while being operated upon.

In event that the blank becomes mutilated or for some reason the ejector does not operate to remove the scrap blank or small parts thereof, there is provided an auxiliary or emergency ejector in the form of a compressed air nozzle 92 which is directed downwardly on the face of the block and blows a blast of air thereagainst for removing any particles. The air is fed to the nozzle through the hose 93 which connects with any suitable source of compressed air supply, not shown herein, through the valve 94 which is operated by the lever 95 fulcrumed at 96 and actuated by a cam 97 secured exteriorly of the housing 40 on the shaft 41. The action of this cam is so timed as to cause a blast of compressed air to be blown immediately after the ejecting action of the arm 60.

The invention claimed is:

1. Apparatus for feeding blanks in position on the die head of a stamping press including a reciprocating member, means for reciprocating said member with respect to said die head, the forward end of said member being provided with a recess for receiving one of said blanks, a gripping head on said member associated with said recess for clamping said blank therein when in retracted position, means for causing said gripping head to release said blank when carried forwardly into operative position on said die head, and a latch for maintaining said head in non-clamping position during the retraction thereof so as to permit another blank to be engaged in said recess and thereafter release said head upon the complete retraction thereof.

2. Apparatus for feeding blanks in position on the die head of a stamping press including a reciprocating feeding member, means for reciprocating said member with respect to said die head, said member having a recess for receiving a blank, a gripping head movably mounted with respect to said member in position to grip said blank in said recess when in one position and release the same when in another position, a spring for normally exerting a force on said head for holding it in gripping position, and means for compressing said spring upon said member reaching the limit of its forward movement and moving said head out of gripping position for releasing said blank.

3. Apparatus for feeding blanks in position on the die head of a stamping press including a reciprocating feeding member, means for reciprocating said member with respect to said die head, said member having a recess for receiving a blank, a gripping head movably mounted with respect to said member in position to grip said blank in said recess when in one position and release the same when in another position, a springs for normally exerting a force on said head for holding it in gripping position, means for compressing said spring upon said member reaching the limit of its forward movement and moving said head out of gripping position for releasing said blank, and a spring pressed latch for engaging said gripping head and maintaining it in non-gripping position until another blank has entered said recess.

4. Apparatus for feeding blanks in position on the die head of a stamping press including a longitudinally reciprocable feeding member having a blank engaging recess in the forward end thereof, a barrel in which said member is adapted to reciprocate, rack teeth formed on said member, an oscillating pinion for engaging said teeth and imparting a reciprocating motion to said member, means for oscillating said pinion, a gripping head movable in said member in position to clamp said blank in said recess when in one position and release it when in another position, a rod connected with said head and extending rearwardly through said member and barrel. a spring surrounding said rod and normally forcing said head into gripping position, a stop on said rod adapted to engage said barrel for compressing said spring and moving said head to releasing position, and a latch adapted to engage said head upon the compression of said spring for maintaining it in releasing position until said member is retracted and said head is released by said latch by the engagement thereof with said barrel.

5. Apparatus for feeding blanks in position on the die head of a stamping press including a reciprocating member, means for reciprocating said member, and means on said member for gripping said blank in one position, carrying it forwardly and simultaneously turning it to another position for release on said die head.

6. Apparatus for feeding blanks in position on the die head of a stamping press including a reciprocating feeding member, means for reciprocating said member, means on said member for gripping a blank in vertical position, and means for causing said member to partially rotate for turning said blank to a horizontal position as it is carried forwardly onto said die head.

7. Apparatus for feeding blanks in position on the die head of a stamping press including a reciprocating feeding member, means on said member for gripping said blank when in retracted position, means for reciprocating said member, a barrel member in which said feeding member is reciprocably mounted, a cam slot in one of said members, and a fixed projection on the other member extending into said cam slot whereby the reciprocatory movement of said feeding member with respect to said barrel member will cause a quarter rotation thereof.

8. Apparatus for feeding blanks in position on the die head of a stamping press, holding them thereon and ejecting them therefrom, including a feeding member for feeding blanks in operative position on said die head, a member for holding one of said blanks in position to be operated upon and thereafter ejecting it from said die head, and means for actuating said members.

9. Apparatus for feeding blanks in position on the die head of a stamping press, holding them thereon and ejecting them therefrom, including a reciprocating feeding member for feeding blanks into position on said die head, a swinging arm for engaging said blank and holding it in operative position during the cutting operation of said press and thereafter swinging laterally for ejecting it from said die head, and means for operating said member and arm.

10. Apparatus for feeding blanks in position on the die head of a stamping press, holding them thereon and ejecting the scrap blanks therefrom, including a feeding member for engaging one of said blanks and carrying it into position on said die head, fixed stops on said die head adapted to be engaged by said blank when in operative position, a laterally oscillating arm movable into engagement with said blank for holding it against said stops while being operated upon, and means for operating said feeding member and moving said oscillating arm for ejecting the scrap blank from the die head after being operated upon.

11. Apparatus for feeding blanks in position on the die head of a stamping press, holding them thereon and ejecting the scrap blanks therefrom, including a feeding member for engaging one of said blanks and carrying it into position on said die head, fixed stops on said die head adapted to be engaged by said blank when in operative position, a laterally oscillating arm movable into engagement with said blank for holding it against said stops while being operated upon, means for operating said feeding member and moving said oscillating arm for ejecting the scrap blank from the die head after being operated upon, and an auxiliary ejector for forcing any mutilated parts of said scrap blank from said die head which are not ejected by said arm.

12. Apparatus for feeding blanks in position on the die head of a stamping press, holding them thereon and ejecting the scrap blanks therefrom, including a feeding member for engaging one of said blanks and carrying it into position on said die head, fixed stops on said die head adapted to be engaged by said blank when in operative position, a laterally oscillating arm movable into engagement with said blank for holding it against said stops while being operated upon, means for operating said feeding member and moving said oscillating arm for ejecting the scrap blank from the die head after being operated upon, a compressed air nozzle adapted to discharge compressed air onto the surface of said die head for forcing therefrom any mutilated parts of the scrap blank which may not be ejected by said arm, and means for causing a blast of compressed air to be discharged in timed relation with the operation of said arm.

13. Apparatus for holding blanks on the die head of a stamping press and ejecting the scrap blanks therefrom, including an oscillatory arm, means for moving said arm into position to engage an edge of the blank to be operated upon, a finger associated with said arm adapted to engage another edge of said blank whereby said blank will be gripped between said arm and finger and held in position thereby during the action of the press, and means for causing said arm to move laterally for ejecting said scrap blank from said die head after the pressing operation has been completed.

14. Apparatus for holding blanks on the die head of a stamping press and ejecting the scrap blanks therefrom, including an oscillatory arm, a swinging arm, means for elevating said arm as it is swung into blank engaging position for causing it to pass over said blank and permitting it to drop into blank engaging position for holding said blank during the operation thereon, and means for swinging said arm in the opposite direction after the operation on said blank for ejecting the scrap from the die head.

15. Apparatus for holding blanks on the die head of a stamping press and ejecting the scrap blanks therefrom, including an oscillatory arm, a swinging arm, means for elevating said arm as it is swung into blank engaging position for causing it to pass over said blank and permitting it to drop into blank engaging position for holding said blank during the operation thereon, means for swinging said arm in the opposite direction after the operation on said blank for ejecting the scrap from the die head, and a spring pressed finger connected with said arm adapted to engage said blank for causing it to be gripped between said finger and arm.

16. Apparatus for holding blanks on the die head of a stamping press and ejecting the scrap blanks therefrom, including an oscillatory arm, a swinging arm, means for elevating said arm as it is swung into blank engaging position for causing it to pass over said blank and permitting it to drop into blank engaging position for holding said blank during the operation thereon, means for swinging said arm in the opposite direction after the operation on said blank for ejecting the scrap from the die head, a plurality of cams for operating said arm in both its oscillating and elevating movements, and means for driving said cams.

17. Apparatus for holding blanks on the die head of a stamping press and ejecting the scrap blanks therefrom, including an arm adapted to swing over the surface of said die block, a vertical oscillatory shaft upon which said arm is secured, a finger pivotally connected with said arm, a spring for exerting a pressure on said finger, a cam for imparting a swinging movement to said arm, a second cam for elevating said shaft and arm during its swinging movement in one direction, and means for driving said cams whereby said arm will be elevated and swung over said blank into engaging position with the far edge thereof so as to clamp said blank against said finger and hold it during the operation thereon and thereafter move it away from said die block for ejecting the blank therefrom.

In witness whereof, I have hereunto affixed my signature.

CHARLES R. MOON.